(12) United States Patent
Anand

(10) Patent No.: US 9,020,859 B2
(45) Date of Patent: Apr. 28, 2015

(54) FRAUD PREVENTION FOR TRANSACTIONS

(71) Applicant: Ramalingam Krishnamurthi Anand, Los Altos Hills, CA (US)

(72) Inventor: Ramalingam Krishnamurthi Anand, Los Altos Hills, CA (US)

( * ) Notice: Subject to any disclaimer, the term of this patent is extended or adjusted under 35 U.S.C. 154(b) by 0 days.

(21) Appl. No.: 14/024,421

(22) Filed: Sep. 11, 2013

(65) Prior Publication Data

US 2014/0337218 A1 Nov. 13, 2014

Related U.S. Application Data

(63) Continuation-in-part of application No. 13/893,165, filed on May 13, 2013.

(51) Int. Cl.
G06Q 20/00 (2012.01)
G06Q 20/40 (2012.01)

(52) U.S. Cl.
CPC .............. *G06Q 20/40* (2013.01); *G06Q 20/401* (2013.01)

(58) Field of Classification Search
USPC ............................................... 705/16, 64, 75
See application file for complete search history.

(56) References Cited

U.S. PATENT DOCUMENTS

| | | | |
|---|---|---|---|
| 7,784,684 B2 * | 8/2010 | Labrou et al. | 235/380 |
| 2003/0191721 A1 * | 10/2003 | Fiammante | 705/65 |
| 2008/0319889 A1 | 12/2008 | Hammad | |
| 2012/0246076 A1 | 9/2012 | Kobayashi | |
| 2012/0271712 A1 | 10/2012 | Katzin et al. | |
| 2012/0290482 A1 | 11/2012 | Atef et al. | |
| 2012/0330787 A1 | 12/2012 | Hanson et al. | |
| 2014/0337216 A1 | 11/2014 | Anand | |

OTHER PUBLICATIONS

Authorized officer Hye Lyun Park, International Search Report and Written Opinion in PCT/US2014/037103, mailed Sep. 1, 2014, 13 pages.

* cited by examiner

*Primary Examiner* — Tsan-Yu J Huang
(74) *Attorney, Agent, or Firm* — Fish & Richardson P.C.

(57) ABSTRACT

Methods, systems, and apparatus include computer programs encoded on a computer-readable storage medium, and include a method for fraud prevention. A method includes receiving registration information for a user, including identities of the user and an authenticating device and a payment source identifier, and storing the registration information. A payment authorization request relating to a transaction purported to be by the user and including the payment source identifier is received. Using the payment source identifier, the identity of the user and the authenticating device is retrieved. A communication is provided to the user including transaction information. The message is delivered to the user at the authenticating device. The method also includes receiving (and subsequently forwarding) either a payment authorization or a payment repudiation responsive to the communication from the user by way of the authenticating device.

24 Claims, 3 Drawing Sheets

FRAUD PREVENTION FOR TRANSACTIONS

BACKGROUND

This specification relates to electronic transactions.

Users can use point-of-sale (POS), online ecommerce, ATMs (Automatic Teller Machines) or other systems to initiate transactions, e.g., too make purchases online, at brick-and-mortar storefront, or at other locations. A transaction can occur, for example, when a user makes a purchase of goods (e.g., products) or services (e.g., rentals). Fraudulent transactions arise when, for example, the user did not actually make the purchase, the user's payment source was compromised, the user's account or other payment-related information was erroneously used, or when other misuse occurs. The detection of fraudulent (i.e., at the moment of the occurrence of the fraud) activity can be difficult.

SUMMARY

Methods, systems, apparatus and computer program products are provided for near real time fraud detection associated with a transaction. A computer-implemented method includes receiving, during registering, registration information for a user, including receiving an identity of the user, an identifier for an authenticating device, and a payment source identifier. The method includes storing the registration information and receiving a payment authorization request relating to a transaction purported to be by the user. The payment authorization request includes the payment source identifier and transaction details including a transaction amount and information describing one or more details of the transaction. The method further includes using the payment source identifier, identifying the user including retrieving the identity of the user and the identifier for the authenticating device and providing a communication to the user including creating a message including transaction information and delivering the message to the user at the authenticating device. The method further includes receiving either a payment authorization or a payment repudiation responsive to the communication from the user by way of the authenticating device and providing either a payment authorization or a payment repudiation responsive to the payment authorization request.

Aspects of the invention may include one or more of the following features. The payment source identifier can be a credit card number or a debit card number. The authenticating device can be a mobile telephone or a mobile computing device. The identity of the user can be an identifier created by the user at registration. Storing the registration information can include storing the registration information in a data structure indexed by payment source identifier.

The method can further include presenting by the user the payment source identifier to a merchant either online or at a brick-and-mortar presence for the transaction, and wherein, prior to the merchant receiving confirmation of the transaction, providing the communication to the user. Providing the communication to the user can include providing either a telephone message, a text message, or an email message to the user, including transaction details. Receiving registration information includes receiving or setting a default transaction limit, and wherein communicating with the user only occurs when the transaction is above the default transaction limit.

The method can further include evaluating the received payment authorization request, determining the default transaction limit associated with the user, and approving the transaction responsive to the payment authorization request when the transaction amount is less than the default transaction limit. Providing a communication to the user can include presenting a user interface to the user on the authenticating device that includes information for the transaction. The information for the transaction can include transaction amount, a transaction date and time, a transaction location, a merchant name and a control for selection by the user to either accept or repudiate the transaction.

When a repudiation is received from the user, the method can include providing an alert to a sponsor of the payment source indicating the repudiation or providing a follow up message to the user on the authenticating device including a control for linking the user to a payment source sponsor to enable further action related to the payment source. The further action can be the cancelling of the payment source or the suspension of payment source. When a repudiation is received from the user, the method can include adding the merchant associated with the transaction to a list of disapproved merchants and using the list of disapproved merchants to either automatically repudiate future transactions or to alert the user of prior repudiated transactions when communicating to the user about a pending transaction.

The payment source identifier can be a checking or savings account number. The transaction can be an automated clearing house (ACH) transaction. The registering can be performed with a payment source sponsor or with a clearing house associated with the payment source.

The method can further include determining when a payment authorization or repudiation has been provided, and when not provided within a predetermined amount of time since providing the communication, automatically authorizing the transaction when the transaction amount is less than a predetermined amount or is a common transaction. The method can further include identifying common transactions including identifying the transaction as common when a user has historically made transactions with a same merchant for similar amounts in a recent past. The predetermined amount can be set based on a location or activity of the user.

The method can further include separately authorizing the transaction using a clearing service. The authenticating device can be a mobile electronic device and the payment source can be a credit card or debit card, the method can further include inhibiting the transaction when a user fails to present both the payment source and a payment authorization as displayed on the authenticating device. The method can further include determining a location associated with an authenticating device and a location associated with the transaction and automatically approving a given transaction without requiring separate acceptance or repudiation when the distance between the two locations is less than a predetermined amount.

Particular implementations may realize none, one or more of the following advantages. Users can register to receive notifications of payments that are associated with payment methods and devices for which they have registered. Because the authorizations are received in near real-time, users can authorize or repudiate a particular individual transaction. A user can suspend or cancel a payment method, e.g., if the user suspects fraudulent activity involving their accounts. Authentication of user transactions can use a two- or multi-factor authentication process. For example, transaction success can be based at least in part on actions performed on a mobile device independent of and unconnected to a physical credit/debit/check card or other payment source.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, mechanisms and methods for fraud prevention. For example, a user can register for a service for preventing fraud on accounts that are associated with the user. The registration can include user identification of a payment source identifier, such as a credit or debit card number, a checking or savings account number, or information for some other payment source. The user can also designate an authentication device that is a device that will be communicated with (e.g., provided with notifications) in order to authenticate transactions associated with registered payment sources. Once the user is registered, payment-related or withdrawal-related transactions that are associated with the user's payment sources can occur. For each transaction determined to be related to the user, the user can receive a notification that includes information obtained from a corresponding payment/debit/withdrawal transaction. The notification can be to the authentication device that is designated by the user. The user can either authorize or repudiate the payment. Other user actions and/or options are possible.

Figure 1:
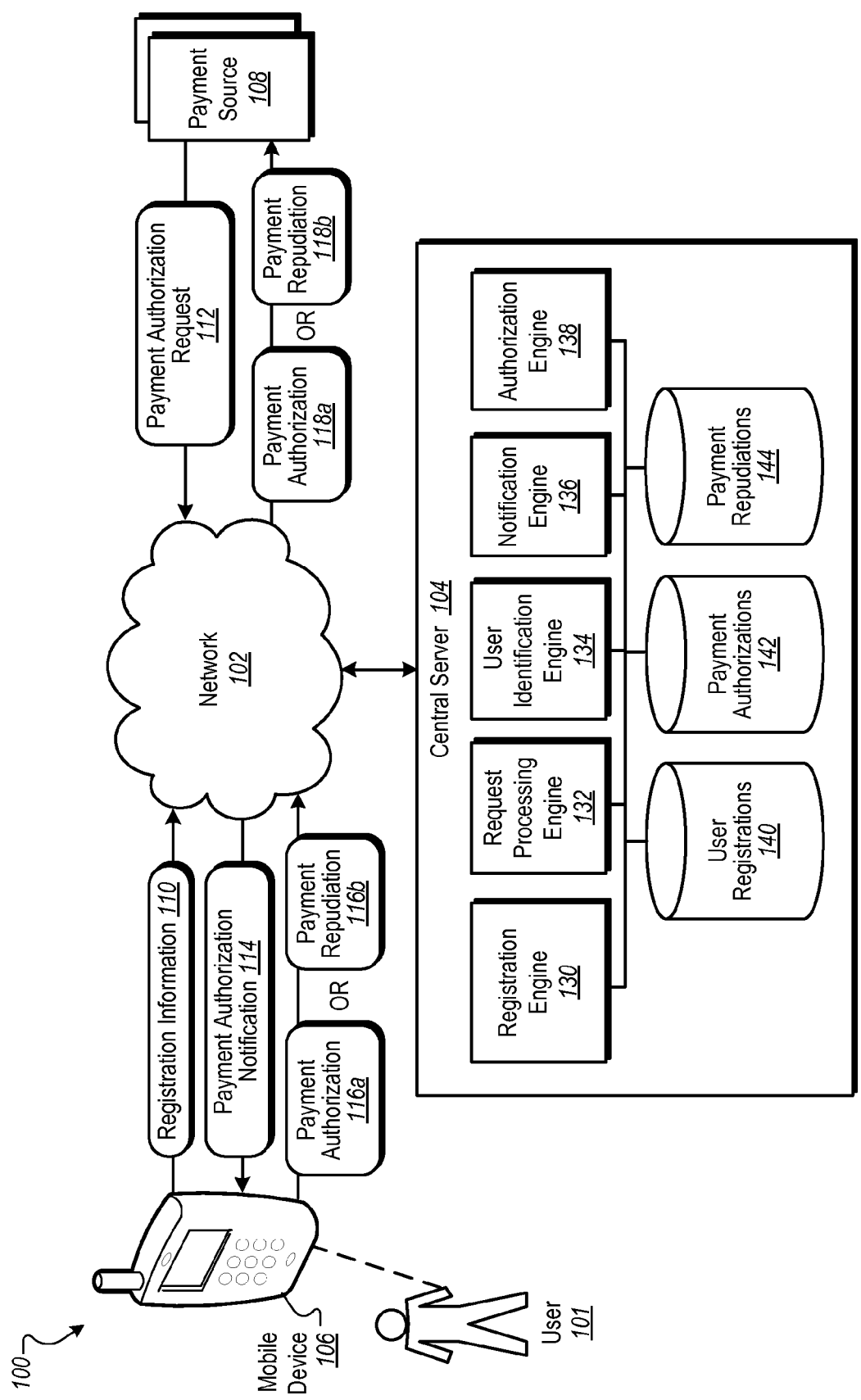
FIG. 1 is a block diagram of an example environment for fraud prevention involving payment-related transactions.

FIG. 1 is a block diagram of an example environment 100 for fraud prevention involving payment-related transactions. The example environment 100 includes at least one payment system 108 (e.g., a point-of-sale (POS) system) and at least one authentication device (e.g., mobile device 106). The example environment 100 further includes a central server 104 for registering users 101, receiving and processing payment authorization requests 112, providing payment authorization notification 114 to users 101, receiving payment authorizations 116a and payment repudiations 116b from users, and providing payment authorizations 118a and payment repudiations 118b (e.g., to payment systems 108 and/or other systems). The example environment 100 includes a secure network/s 102, such as a local area network (LAN), a wide area network (WAN), the Internet, or a combination thereof. The network/s 102 connects the payment systems 108, mobile devices 106, the central server 104 and other systems that may interact with the payment systems 108, the mobile devices 106, and the central server 104. The example environment 100 may include many thousands of payment systems 108 and mobile devices 106. While the examples in this disclosure generally discuss mobile devices (e.g., mobile device 106), the systems, mechanisms and methods described herein can also use, or apply to, other authentication devices including non-mobile devices.

The central server 104 can include plural engines. A registration engine 130 can receive registration information 110 from the mobile devices 106. The registration information 110, for example, can include an identity of the user (e.g., user name, etc.), an identifier for an authenticating device (e.g. that identifies the mobile device 106), and a payment source identifier, such as a credit card number, account number or other payment source for the user 101. In some implementations, the registration engine 130 can store and access user registration information in a data store of user registrations 140.

A request processing engine 132 can process payment authorization requests 112 received by the central server 104. Each payment authorization request 112, for example, can be associated with a payment-related transaction purported to be by (or associated with) the user 101. Each payment authorization request 112 can include at least a payment source identifier and transaction details, including a transaction amount and information describing one or more details of the transaction.

A user identification engine 134 can use user-related information from the payment authorization request 112 to identify a user (e.g., the user 101) that is associated with a corresponding transaction. Identification of the user 101 can be facilitated, for example, by matching user-related information in the payment authorization request 112 with information in the user registrations 140.

A notification engine 136 can create notifications to be provided to the user 101. For example, the payment authorization notification 114 can include a communication that is provided to the user 101. The communication can include transaction information and can be delivered to the user 101 at the authentication device (e.g., the mobile device 106).

An authorization engine 138 can process payment authorizations 116a and payment repudiations 116b received from users. For example, the payment authorizations 116a and the payment repudiations 116b can be stored in a data store of payment authorizations 142 and a data store of payment repudiations 144, respectively. The authorization engine 138 can also provide payment authorization and/or repudiation information to systems outside of the client server 104, such as payment authorizations 118a and payment repudiations 118b that are provided to payment systems 108 or other systems.

Figure 2:
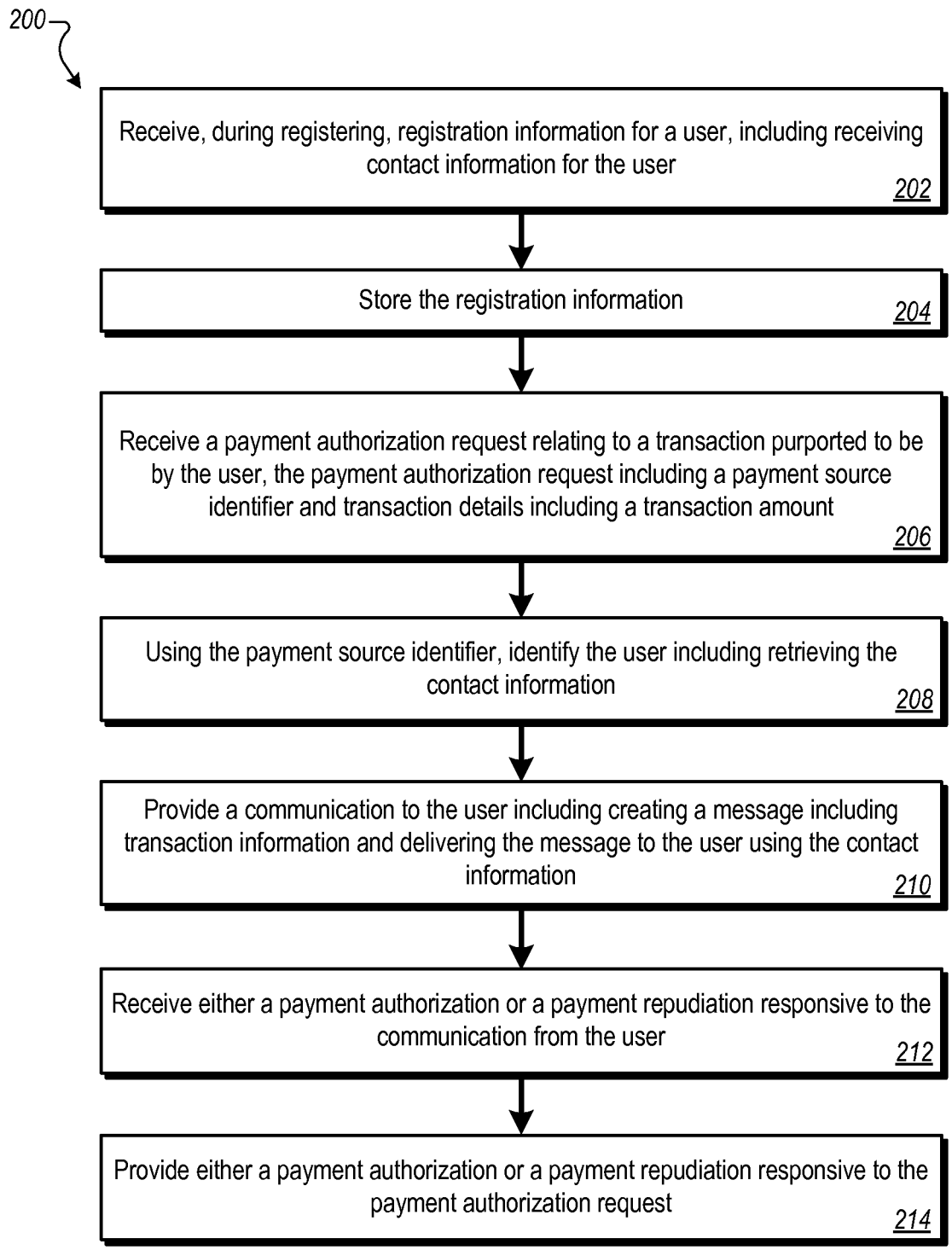
FIG. 2 is a flowchart of an example process for authorization or repudiation of a payment associated with a user.

FIG. 2 is a flowchart of an example process 200 for authorization or repudiation of a payment associated with a user. In some implementations, the central server 104 and/or its components can perform stages of the process 200 using instructions that are executed by one or more processors. FIG. 1 is used to provide example structures for performing the stages of the process 200.

Registration information for a user is received, including, for example an identity of the user, an identifier for an authenticating device (or other contact information for the user), and a payment source identifier (202). For example, the central server 104 can receive registration information 110 from the mobile device 106. The registration information 110 can include, for example, a user name or other user identification information for the user 101, a device identifier for registering the mobile device 106 with the central server 104, and credit card and/or payment source information. In some implementations, the registration engine 130 can process the received registration information 110 to ensure that the information is complete.

In some implementations, the payment source identifier can be a credit card number or a debit card number. As an example, when the user 101 registers, the user 101 can provide credit card information that identifies a name, a credit card number, an expiration date, billing information, and/or other information associated with a credit card or debit card.

In some implementations, the payment source identifier can be a checking or savings account number. For example, during the registration process, the user 101 can designate checking, savings or other bank account numbers associated with payment-related transactions, e.g., from which to draw funds to complete a purchase transaction.

In some implementations, the authenticating device can be a mobile telephone or a mobile computing device and the contact information can be the mobile telephone number associated with the user. As an example, registration information that the user 101 includes during the registration process can include at least one computer device (e.g., the mobile device 106) to which notifications of payment transactions are to be sent for review by the user 101.

In some implementations, the identity of the user can be an identifier created by the user at registration. For example, the user 101 can provide a user identifier or other identifier that is used for registration purposes and which may or may not be the user's name or include an email address or other user-unique information.

In some implementations, the registering can be performed with a payment source sponsor. For example, the user 101 can complete the registration process while accessing a web site associated with a credit card company, such as at the same time or a different time that a purchase is being made.

In some implementations, registering can be performed with a clearing house or association associated with the payment source. As an example, the user 101 can complete the registration process while accessing a web site associated with a clearing house or association associated with credit/debit card transactions.

The registration information is stored (204). For example, the registration engine 130 can store the registration information 110 in the user registrations 140, which may store multiple registrations for the user 101 and other users.

In some implementations, storing the registration information can include storing the registration information in a data structure indexed by payment source identifier. For example, the registration engine 130 can store information from the registration information 110 in the user registrations 140, which can be indexed by payment source identifier (e.g., credit card number, etc.).

A payment authorization request is received that relates to a transaction purported to be by the user (206). In some implementations, the payment authorization request includes the payment source identifier and transaction details, including a transaction amount and information describing one or more details of the transaction. For example, the central server 104 can receive a payment authorization request 112 from the payment system 108 or some other payment system. The payment authorization request 112, for example, can be related to a transaction that is purported to be by the user 101, such as a point-of-sale transaction, online purchase (e.g., a camera purchase on a camera-selling website), or some other transaction. The payment authorization request 112 can include the payment source identifier (e.g., credit card number associated with the user 101) and transaction details, including a transaction amount (e.g., purchase amount) and information describing one or more details of the transaction (e.g., camera model purchased). A request processing engine 132, for example, can process the payment authorization request 112.

In some implementations, the transaction can be an automated clearing house (ACH) transaction. As an example, the transaction can be an automatic transfer of funds associated with the user, such as a monthly payment for a loan, utility or other regular payment.

Using the payment source identifier, the user is identified, including retrieving the contact information for the user (e.g., the identity of the user and the identifier for the authenticating device) (208). For example, the user identification engine 134 can use a credit card number that is included in the payment authorization request 112 to identify the user 101 as the user who is associated with the transaction. The identification can include looking up information for the user 101 in the user registrations 140, e.g., using the credit card number from the transaction to identify the user 101 and the mobile device 106 and telephone number for the mobile device.

A notification is created that includes transaction information, and the notification is delivered to the user at the authenticating device (210). For example, the notification engine 136 can create the payment authorization notification 114, which the content server 104 can provide to the mobile device 106 for presentation to the user 101. The notification, for example, can identify a transaction involving the camera purchase on a camera-selling website.

In some implementations, the payment source identifier can be presented by the user to a merchant either online or at a brick-and-mortar presence for the transaction, and prior to the merchant receiving confirmation of the transaction, the communication can be provided to the user. For example, the user can provide a credit card number or other payment source identifier while making a purchase on a website or at a physical store. In this example, the payment authorization notification 114 can be provided to the user 101 (for review and handling by the user 101) before the merchant receives confirmation of the purchase information.

In some implementations, providing the communication to the user can include providing a telephone message, a text message, or an email message to the user, including transaction details. As an example, the user can receive the payment authorization notification 114 in the form of a telephone call, a voice message, or a text message sent to the mobile device 106. In another example, the payment authorization notification 114 can be in the form of an email message that is sent to an email account for the user 101, e.g., that is accessible using the mobile device 106. Other forms of communication can be used, and multiple forms can be used for any one payment authorization notification 114, e.g., depending on user settings specified during registration.

In some implementations, providing a communication to the user can include presenting a user interface to the user on the authenticating device that includes information for the transaction. For example, the central server 104 can provide the payment authorization notification 114 (e.g., for the online camera purchase) to the mobile device 106 for presentation to the user 101. In some implementations, information for the transaction can include a transaction amount, a transaction date and time, a transaction location, a merchant name, and a control for selection by the user to either accept or repudiate the transaction. As an example, the payment authorization notification 114 can identify a dollar (or any other currency amount) amount of the purchase or payment, the time and date that the purchase was made, a website name and/or physical address of the entity to which the payment is made, a company name, and one or more user interface controls for either accepting or repudiating the transaction.

In some implementations, receiving registration information can include receiving or setting a default transaction limit, and communicating with the user may occur only when the transaction is above the default transaction limit. For example, during the registration process, the user 101 can specify a dollar (a currency threshold) amount, and transactions having amounts exceeding the specified dollar amount are to be communicated to the user.

In some implementations, the received payment authorization request is evaluated, the default transaction limit associated with the user is determined, and the transaction responsive to the payment authorization request is approved when the transaction amount is less than the default transaction limit. As an example, transactions involving amounts not exceeding the limit are to be authorized automatically, e.g., without user intervention (but can still be rapidly reported to the user).

Either a payment authorization or a payment repudiation response to the communication is received from the user by way of the authenticating device (212). For example, after reviewing the payment authorization notification 114 (e.g., identifying the camera purchase on the camera-selling website), the user can use controls (e.g., in a payment authorization application (sometimes referred to as Mobile App) or other suitable interface) on the mobile device 106 to authorize or repudiate the payment. As a result of the user selection, the payment authorization application, for example, on the mobile device 106 can produce the corresponding one of either the payment authorization 116a or the payment repudiation 116b to be received by the central server 104.

In some implementations, when a repudiation is received from the user, an alert is provided to a sponsor of the payment source indicating the repudiation. For example, if the user causes a payment repudiation 116b to be created, then the central server 104 can provide an alert identifying the repudiation to the user's bank, credit card company or other payment source sponsor associated with the user's account, credit/debit card or other payment method.

In some implementations, when a repudiation is received from the user, an alert is provided to the merchant indicating the repudiation. This could allow the merchant to take further actions—including stopping the merchandise from being given to fraudulent buyer and/or informing law enforcement of the incident.

In some implementations, when a repudiation is received from the user, a follow-up message is provided to the user on the authenticating device, including a control for linking the user to a payment source sponsor to enable further action related to the payment source. As an example, if the user 101 repudiates a payment, then additional information and controls are provided to the user 101 by which the user can link to the payment source sponsor's (e.g., credit card company's) web site at which the user 101 can resolve the situation or take some other action. In some implementations, further actions can include, for example, cancelling the payment source (e.g., credit card), suspending the payment source, or some other action related to the payment source.

In some implementations, when a repudiation is received from the user, the merchant associated with the transaction is added to a list of disapproved merchants, and the process 200 further includes using the list of disapproved merchants to either automatically repudiate future transactions or to alert the user of prior repudiated transactions when communicating to the user about a pending transaction. For example, a specific camera-selling website can be added to a list (e.g., a blacklist) of merchants and/or websites that are disapproved by the user 101.

Either a payment authorization or a payment repudiation responsive to the payment authorization request is provided (214). As an example, the authorization engine 138 can provide the corresponding one of either the payment authorization 118a or the payment repudiation 118b to the payment system 108 and/or other systems.

In some implementations, the process 200 can further include determining when a payment authorization or repudiation has been provided, and when not provided within a predetermined amount of time since providing the communication, automatically authorizing the transaction when the transaction amount is less than a predetermined amount or is a common transaction. For example, for any given payment authorization request 112 and subsequent payment authorization notification 114, the central server 104 can automatically authorize the corresponding purchase if a pre-determined time (e.g., two minutes) expires and no authorization or repudiation is received from the user 101. In another example, the central server 104 can automatically authorize the corresponding purchase if the transaction amount is less than a predetermined amount (e.g., under $100) or is a common transaction (e.g., a recurring payment for loan or utility). In some implementations, the predetermined amount can be set based on a location or activity of the user. For example, a predetermined amount (e.g., under $200) can be established for a specific location such as a grocery store or other place (e.g., online or brick-and-mortar location) at which the user makes regular purchases. In another example, predetermined amounts can be tied to particular activities, such as buying groceries, buying gasoline, eating at a restaurant, or other identifiable and/or regular activities.

In some implementations, the process 200 can further include identifying common transactions, including identifying the transaction as common when a user has historically made transactions with a same merchant for similar amounts in a recent past. For example, the central server 104 can identify a transaction as similar to previous transactions for the same user 101 if the merchant is the same between a pending transaction and previous transactions between the user 101 and the merchant. Common transactions can include, for example, weekly purchases at a grocery store, monthly automatic drafts to utilities or clubs, or other payments that the user 101 may make on a regular basis.

In some implementations, the process 200 can further include separately authorizing the transaction using a clearing service. For example, the user 101 can set up certain types of transactions to be automatically cleared, e.g., if the transactions are regular (e.g., monthly) transactions.

In some implementations, the authenticating device can be a mobile electronic device, the payment source can be a credit card or debit card, and the process 200 can further include inhibiting the transaction when a user fails to present both the payment source and a payment authorization as displayed on the authenticating device. For example, the central server 104 can enforce a rule that transactions cannot occur unless the user 101 uses one of one or more designated payment sources (e.g., specific credit cards) and shows the merchant a displayed authorization on a specified device (e.g., the user's mobile device 106). The user 101 can specific such a rule, for example, during registration.

In some implementations, providing a communication to the user can be based at least in part on whether the authenticating device is within a threshold distance of a location associated with the purchase. For example, central server 104 can generate a payment authorization notification 114 if a global positioning system (GPS) location (e.g., latitude/longitude) of the mobile device 106 is outside of a distance threshold (e.g., ten miles) between the location of the mobile device 106 and the location of the store where the purchase was made using a credit/debit card. If the distance is less than ten miles, for example, then the transaction can be approved automatically. In another example, if the distance is ten or more miles, then the distance difference of the transaction can trigger generation of the payment authorization notification 114 for acceptance from the user of either a payment authorization 116a or a payment repudiation 116b.

Figure 3:
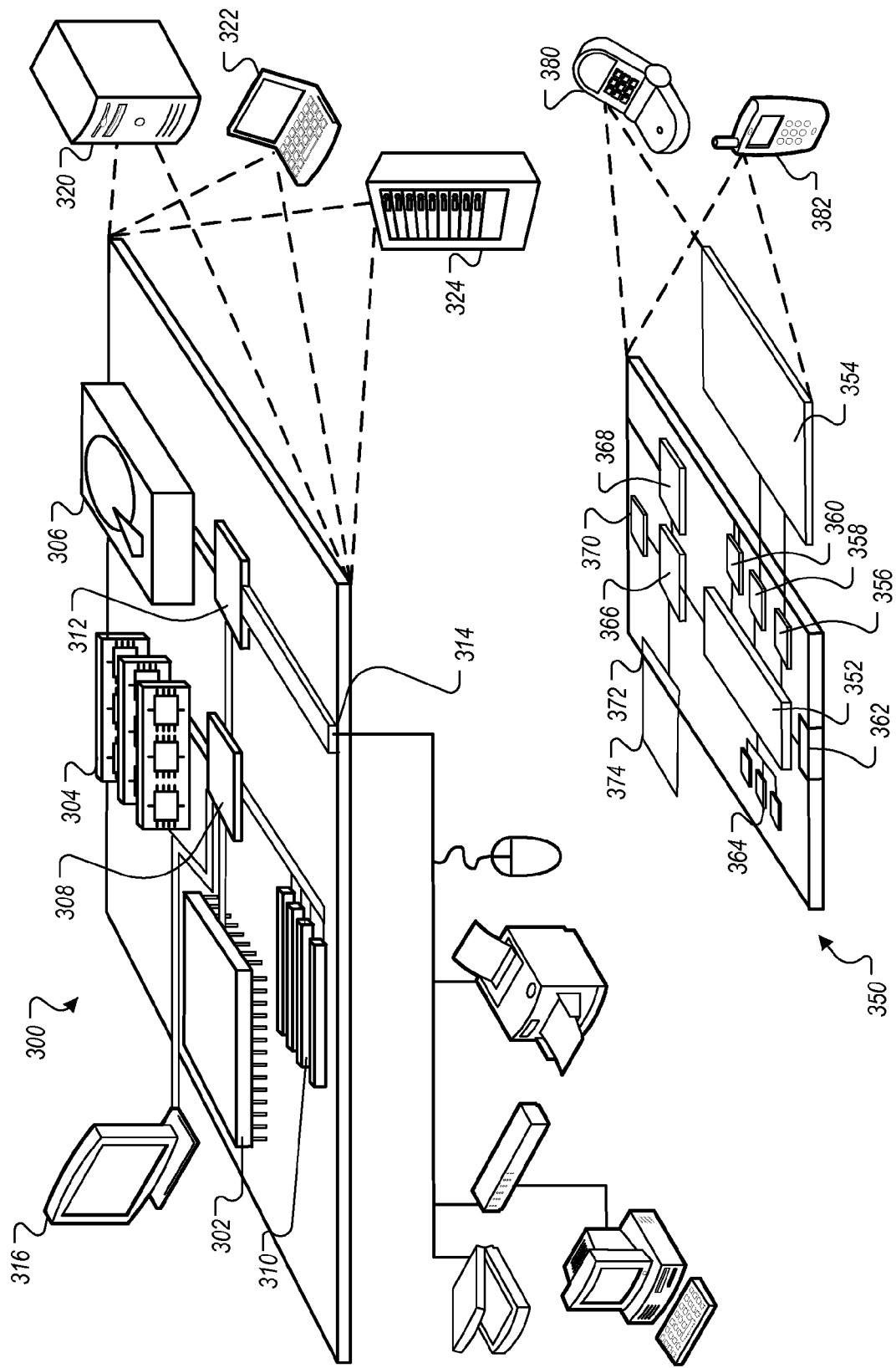
FIG. 3 is a block diagram of an example computer system that can be used to implement the methods, systems and processes described in this disclosure.

FIG. 3 is a block diagram of example computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processors embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a subscriber identification module (SIM) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication that is either secure/encrypted or unsecured (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, during registering with a central service, registration information for a user, including receiving an identity of the user, an identifier for an authenticating device, and a payment source identifier;
   storing the registration information;
   determining a default notification limit associated with the user wherein the default notification limit is based on either or both of the information received during registration and historical transactions associated with the user that have been processed by the central service;
   after the registering, receiving from a third party and at the central service a payment authorization request relating to a transaction purported to be by the user, the payment authorization request including the payment source identifier and transaction details including a transaction amount and information describing one or more details of the transaction;
   evaluating, by one or more processors, the stored registration information including using the received payment source identifier to locate a corresponding user and identifier for the authenticating device associated with the corresponding user in the registration information; and
   comparing the transaction amount included in the transaction details to the default notification limit and when the transaction amount exceeds the default transaction limit then
      providing directly, by the central service, a communication to the corresponding user including creating a message including transaction information and delivering the message to the corresponding user at the identified authenticating device;
      receiving directly, at the central service, a communication from the authenticating device including either a payment authorization or a payment repudiation responsive to the communication from the corresponding user by way of the authenticating device; and
      processing, by the one or more processors, the received payment authorization or repudiation including providing either a payment authorization or a payment repudiation responsive to the payment authorization request to the third party; and
   when the transaction amount does not exceed the default transaction then automatically approving the payment authorization request.

2. The method of claim 1 wherein the payment source identifier is a credit card number or a debit card number.

3. The method of claim 1 wherein the authenticating device is a mobile telephone or a mobile computing device.

4. The method of claim 1 wherein evaluating the registration information includes locating an identifier associated with the corresponding user and wherein the identifier is created by the user at registration.

5. The method of claim 1 wherein storing the registration information includes storing the registration information in a data structure indexed by payment source identifier.

6. The method of claim 1 wherein providing the communication to the corresponding user includes providing either a telephone message, a text message, or an email message to the corresponding user, including transaction details.

7. The method of claim 1 further comprising evaluating the received payment authorization request, determining the default notification limit associated with the corresponding user, and approving the transaction responsive to the payment authorization request when the transaction amount is less than the default notification limit.

8. The method of claim 1 wherein providing a communication to the corresponding user includes presenting a user interface to the corresponding user on the authenticating device that includes information for the transaction.

9. The method of claim 8 wherein the information for the transaction includes transaction amount, a transaction date and time, a transaction location, a merchant name and a control for selection by the corresponding user to either accept or repudiate the transaction.

10. The method of claim 1 wherein when a repudiation is received from the corresponding user, providing an alert to a sponsor of the payment source indicating the repudiation.

11. The method of claim 1 wherein when a repudiation is received from the corresponding user, providing, by the central service, a follow up message to the corresponding user on the authenticating device including a control for linking the corresponding user to a payment source sponsor that is not the third party to enable further action related to the payment source.

12. The method of claim 11 wherein the further action is the cancelling of the payment source.

13. The method of claim 11 wherein the further action is the suspension of payment source.

14. The method of claim 1 wherein when a repudiation is received from the corresponding user, adding, at the central service, the merchant associated with the transaction to a list of disapproved merchants and the method further comprising using the list of disapproved merchants to either automatically repudiate future transactions or to alert the corresponding user of prior repudiated transactions when communicating to the corresponding user about a pending transaction.

15. The method of claim 1 wherein the payment source identifier is a checking or savings account number.

16. The method of claim 1 wherein the transaction is an automated clearing house (ACH) transaction.

17. The method of claim 1 wherein the registering is performed with a payment source sponsor.

18. The method of claim 1 wherein the registering is performed with a clearing house associated with the payment source.

19. The method of claim 1 further comprising determining whether a payment authorization or repudiation has been provided, and when not provided within a predetermined amount of time since providing the communication, automatically authorizing the transaction when the transaction amount is less than a predetermined amount or is a common transaction.

20. The method of claim 19 further comprising identifying common transactions including identifying the transaction as common when a user has historically made transactions with a same merchant for similar amounts in a recent past and approving common transactions without regard for the transaction notification limit or waiting for the payment authorization or repudiation or upon not receiving the payment authorization or repudiation.

21. The method of claim 19 wherein the predetermined amount is set based on a location or activity of the user.

22. The method of claim 1 further comprising separately authorizing the transaction using a clearing service.

23. The method of claim 1 wherein the authenticating device is a mobile electronic device and the payment source is a credit card or debit card, the method further comprising inhibiting the transaction when a user fails to present both the payment source and a payment authorization as displayed on the authenticating device.

24. The method of claim 1 further comprising determining a location associated with an authenticating device and a location associated with the transaction and automatically approving a given transaction without requiring separate acceptance or repudiation when the distance between the two locations is less than a predetermined amount.

* * * * *